United States Patent [19]

Monzaki

[11] Patent Number: 5,709,439
[45] Date of Patent: Jan. 20, 1998

[54] STABILITY CONTROL DEVICE OF VEHICLE PREPARED FOR MANUAL BRAKE UPRISE SUBSEQUENT TO END OF STABILITY CONTROL

[75] Inventor: Shirou Monzaki, Mishima, Japan

[73] Assignee: Toyota Jidosha Kabushiki Kaisha, Toyota, Japan

[21] Appl. No.: 732,986

[22] Filed: Oct. 16, 1996

[30] Foreign Application Priority Data

Oct. 25, 1995 [JP] Japan ............... 7-300687

[51] Int. Cl.$^6$ ............... B60T 8/24; B60T 8/58
[52] U.S. Cl. ............... 303/146; 303/158
[58] Field of Search ............... 303/140, 146, 303/158, 186, 113.4, 116.1, 116.2, DIG. 6; 364/426.016

[56] References Cited

U.S. PATENT DOCUMENTS

| | | | |
|---|---|---|---|
| 4,898,431 | 2/1990 | Karnopp et al. | 303/146 |
| 5,188,434 | 2/1993 | Ruf et al. | 303/146 |
| 5,328,254 | 7/1994 | Youngblood | 303/158 |
| 5,494,345 | 2/1996 | Inagaki et al. | 303/163 |

FOREIGN PATENT DOCUMENTS

A-4-372445 12/1992 Japan .
A-6-24304 2/1994 Japan .
A-7-82426 3/1995 Japan .

*Primary Examiner*—Josie Ballato
*Attorney, Agent, or Firm*—Oliff & Berridge, PLC

[57] ABSTRACT

A stability control device of a vehicle includes a device for estimating a liability of the vehicle body to a running instability for producing an instability quantity which generally increases along with increase of the liability; a brake device for selectively applying a variable braking force to each wheel, the brake device including a manually controlled pressure source incorporating a brake pedal and an accumulator pressure source; a manual brake sensor for detecting a substantial stepping on of the brake pedal by a driver; and a controller for controlling the brake device so as to variably apply a braking force to a selected one or ones of the wheels for a stability control of suppressing the vehicle body against the running instability based upon the accumulator pressure, the controller controlling the brake device so that a braking force is applied to the wheels based upon the manually controlled pressure source when the stability control is not carried out, wherein, when the substantial stepping on of the brake pedal is detected by the manual brake sensor when the controller has finished the stability control, the controller controls the brake device so that the braking force based upon the manually controlled pressure source is applied to the wheels under a controlled uprise rate.

4 Claims, 7 Drawing Sheets

STABILITY CONTROL DEVICE OF VEHICLE PREPARED FOR MANUAL BRAKE UPRISE SUBSEQUENT TO END OF STABILITY CONTROL

BACKGROUND OF THE INVENTION

1. Field of the Invention

The present invention relates generally to a behavior control of a vehicle such as an automobile for improving the running stability thereof, and more particularly, to a stability control device for more desirably suppressing the vehicle against spin and/or drift-out, with more desirable preparation for manual braking which uprises immediately subsequent to the end of the stability control.

2. Description of the Prior Art

It is well known that the automobiles and the like vehicles are, when unduly operated, liable to spin and/or drift-out, because the side force applied to the vehicle body as a centrifugal force can increase with no limit along with increase of vehicle speed and steering angle, while the tire grip force for holding and steering the vehicle along the road surface against the side force is limited, particularly to be less on a slippery wet road.

Various endeavors have been made to suppress the automobiles and the like vehicles against spin and/or drift-out. An example is shown in Japanese Patent Laid-open Publication 6-24304, according to which controlled braking forces are applied to respective wheels by a feedback control system such that the actual yaw rate of the vehicle body conforms to a target yaw rate calculated based upon running conditions of the vehicle including steering condition.

In similar endeavors for further improving the vehicle stability against spin and/or drift-out, the present inventor has particularly noted that, when the vehicle is put into a manual braking immediately after the end of the stability control due to a stepping on of the brake pedal made by the driver during the operation of the stability control, the vehicle is applied with an abrupt braking effect so that a next instability may be induced, thus causing a hunting of control when certain conditions are unfortunately met.

SUMMARY OF THE INVENTION

In view of the above inconvenience, it is a principal object of the present invention to provide a more improved stability control device of a vehicle such as an automobile which can effectively suppress the vehicle against spin and or drift-out with a desirable harmony in connection to the manual braking.

According to the present invention, the above-mentioned object is accomplished by a stability control device of a vehicle having a vehicle body, and front left, front right, rear left and rear right wheels, comprising:

a means for estimating a liability of the vehicle body to a running instability for producing an instability quantity which generally increases along with increase of the liability;

a brake means for selectively applying a variable braking force to each of said wheels, said brake means including a manually controlled pressure source means incorporating a brake pedal and an accumulator pressure source means;

a manual brake sensing means for detecting a substantial stepping on of said brake pedal by a driver; and a control means for controlling said brake means so as variably to apply a braking force to a selected one or ones of said wheels for a stability control of suppressing the vehicle body against the running instability based upon said accumulator pressure, said control means controlling said brake means so that a braking force is applied to the wheels based upon said manually controlled pressure source means when said stability control is not carried out, wherein, when the substantial stepping on of said brake pedal is detected by said manual brake sensing means when said control means ends said stability control, said control means controls said brake means so that the braking force based upon said manually controlled pressure source means is applied to the wheels under a controlled uprise rate.

By such an arrangement, it is avoided that an abrupt braking effect due to a manual braking is applied to the vehicle body immediately after the end of the stability control even when the brake pedal is being stepped on during the stability control to continue after the end thereof.

In the stability control device of the above-mentioned construction, said control means may control said uprise rate separately for the front wheels and the rear wheels.

Further, in the stability control device of the above-mentioned construction, said control means may control said uprise rate to be steppedly increased according to the lapse of time.

Further, in the stability control device of the above-mentioned construction, said control means may control said uprise rate to be lower as the fluid pressure of the manually controlled pressure source means is higher.

BRIEF DESCRIPTION OF THE DRAWING

In the accompanying drawing.

DESCRIPTION OF THE EMBODIMENTS

In the following, the present invention will be described in more detail in the form of preferred embodiments with reference to the accompanying drawings.

Figure 1:
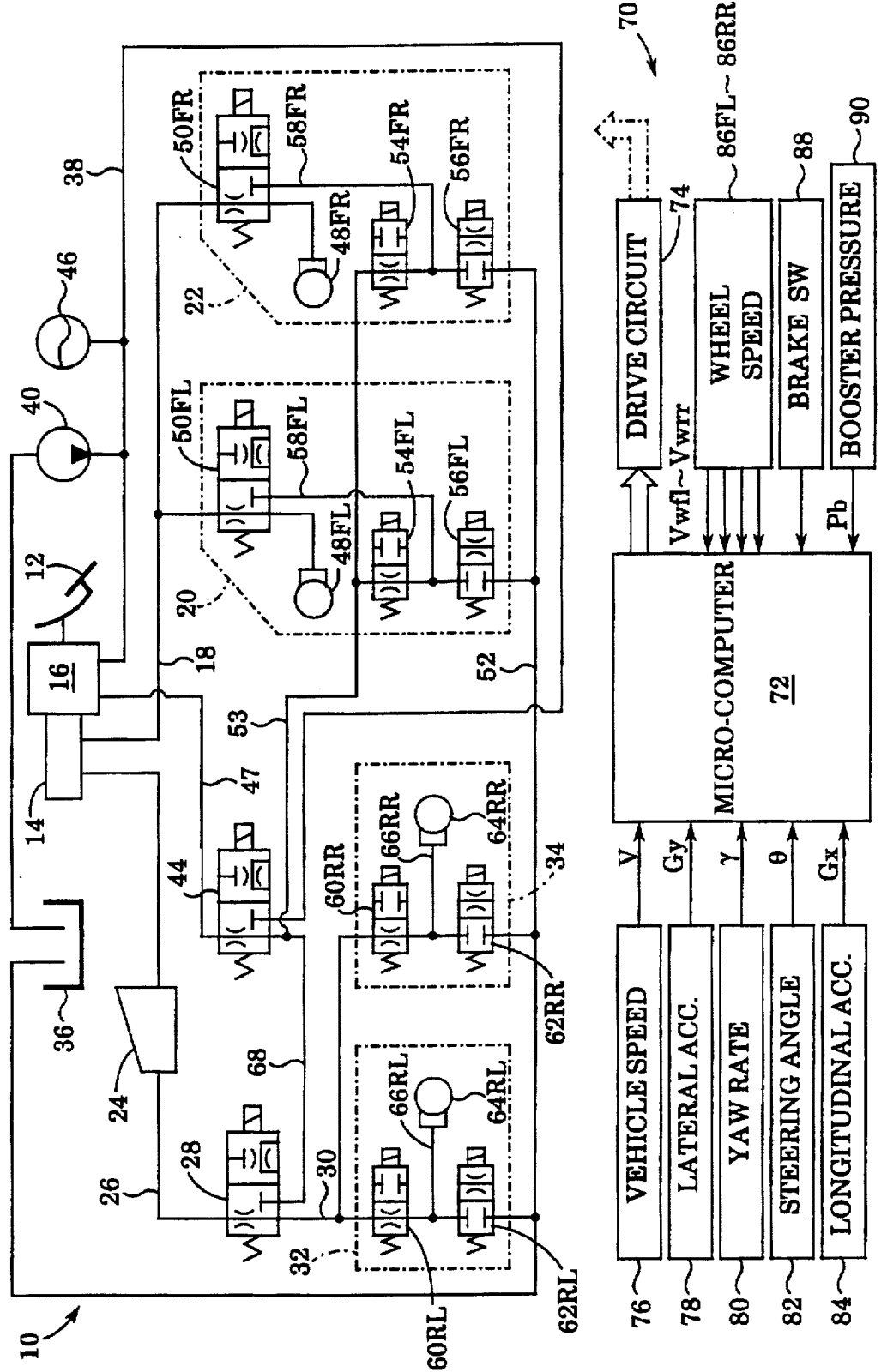
FIG. 1, is a diagrammatic illustration of hydraulic circuit means and electrical control means of an embodiment of the stability control device according to the present invention.

First, referring to FIG. 1 showing diagrammatically an embodiment of the stability control device of the present invention with regard to the constructions of its hydraulic circuit means and its electric control means, the hydraulic circuit means generally designated by 10 comprises a conventional manual brake pressure source means including a brake pedal 12 to be stepped on by a driver, a master cylinder 14 adapted to generate a master cylinder pressure according to the stepping-on of the brake pedal 12, and a hydro-booster 16 which generates a booster pressure.

The hydraulic means 10 further comprises a powered brake pressure source means including a reservoir 36 and a brake fluid pump 40 which delivers a pressurized brake fluid to a passage 38 to which an accumulator 46 is connected, so that a stabilized accumulator pressure for the automatic brake control described hereinbelow is available in the passage 38. The accumulator pressure is also supplied to the hydro-booster 16 as a pressure source for generating a booster pressure which has substantially the same pressure performance as the master cylinder pressure depending upon the stepping-on performance of the brake pedal 12 but is capable to maintain such a pressure performance while the brake fluid is being consumed by a series connection of a normally open type on-off valve and a normally closed type on-off valve to obtain a desired brake pressure, as described hereinbelow.

A first passage 18 extends from a first port of the master cylinder 14 to a front left wheel brake pressure control means 20 and a front right wheel brake pressure control means 22. A second passage 26, including a proportioning valve 24, extends from a second port of the master cylinder 14 toward both of a rear left wheel brake pressure control means 32 and a rear right wheel brake pressure control means 34, via a 3-ports-2-positions changeover type electromagnetic control valve 28, an outlet port of which is connected, via a common passage 30, with the rear left and right wheel brake pressure control means 32 and 34.

The brake pressure control means 20 and 22 of the front left and front right wheels include wheel cylinders 48FL and 48FR for applying variable braking forces to the front left and front right wheels, 3-ports-2-positions changeover type electromagnetic control valves 50FL and 50FR, and series connections of normally open type electromagnetic on-off valves 54FL and 54FR and normally closed type electromagnetic on-off valves 56FL and 56FR, respectively, said series connections of the normally open type on-off valves and the normally closed type on-off valves being connected between a passage 53 adapted to be supplied with the accumulator pressure of the passage 38 or the booster pressure from the hydro-booster through a 3-ports-2-positions changeover type electronic control valve 44 the operation of which is described hereinbelow, and a return passage 52 connected to the reservoir 36. A mid point of the series connection of the on-off valves 54FL and 56FL is connected to a port of the control valve 50FL by a connection passage 58FL, and a mid point of the series connection of the on-off valves 54FR and 56FR is connected to a port of the control valve 50FR by a connection passage 58FR.

The brake pressure control means 32 and 34 of the rear left and rear right wheels include wheel cylinders 64RL and 64RR for applying braking force to the rear left and rear right wheels, respectively, and series connections of normally open type electromagnetic on-off valves 60RL and 60RR and normally closed type electromagnetic on-off valves 62RL and 62RR, said series connections of normally open type on-off valves and the normally closed type on-off valves being connected between the passage 30 connected to the one outlet port of the control valve 28 and the return passage 52. A mid point of the series connection of the on-off valves 60RL and 62RL is connected to a wheel cylinder 64RL for applying braking force to the rear left wheel by a connection passage 66RL, and a mid point of the series connection of the on-off valves 60RR and 62RR is connected to a wheel cylinder 64RR for applying braking force to the rear right wheel by a connection passage 66RR.

The control valves 50FL and 50FR are respectively switched over between a first position for connecting the wheel cylinders 48FL and 48FR with the manual brake pressure passage 18, while disconnecting them from the connection passages 58FL and 58FR, respectively, as in the state shown in the figure, and a second position for disconnecting the wheel cylinders 48FL and 48FR from the passage 18, while connecting them with the connection passages 58FL and 58FR, respectively.

The control valve 28 is switched over between a first position for connecting the passage 30 for both of the series connection of the on-off valves 60RL and 62RL and the series connection of the on-off valves 60RR and 62RR with the manual brake pressure passage 26 as in the state shown in the figure, and a second position for disconnecting the passage 30 from the passage 26, while connecting it with a passage 68 connected to one outlet port of the changeover control valve 44 together with the passage 53, so as to be connected with either a delivery port of the hydro-booster 16 or the accumulator pressure passage 38, according to whether the control valve 44 is in a first position such as shown in the figure or a second position opposite thereto.

When the control valves 50FL, 50FR and 28 are in the first position as in the state shown in the figure, the wheel cylinders 48FL, 48FR, 64RL, 64RR are connected with the manual brake pressure passages 18 and 26 so as to be supplied with the pressure of the master cylinder 14, thereby enabling the driver to apply a braking force to each wheel according to the stepping-on of the brake pedal 12. When the control valve 28 is changed over to the second position, with the control valve 44 being kept at the shown first position, the rear wheel cylinders 64RL and 64RR are supplied with the booster pressure according to the stepping-on of the brake pedal from the hydro-booster 16. When the control valves 50FL, 50FR, 28 and 44 are changed over to the second position, the wheel cylinders 48FL, 48FR, 64RL, 64RR are supplied with the powered accumulator brake pressure of the passage 38 under the control of the normally open on-off valves 54FL, 54FR, 60RL, 60RR and the normally closed type on-off valves 56FL, 56FR, 62RL, 62RR according to the ratio of the open state of the corresponding normally open type on-off valve and the closed state of the corresponding normally closed type on-off valve, i.e. the so-called duty ratio, apart from the stepping-on of the brake pedal 12.

The changeover control valves 50FL, 50FR, 28, 44, normally open type on-off valves 54FL, 54FR, 60RL, 60RR, normally closed type on-off valves 56FL, 56FR, 62RL, 62RR and the pump 40 are all controlled by an electric control means 70 as described in detail hereinbelow. The electric control means 70 consists of a micro-computer 72 and a driving circuit means 74. Although not shown in detail in FIG. 1, the micro-computer 72 may have a general construction including a central processing unit, a read only memory, a random access memory, input and output port means and a common bus interconnecting these functional elements.

The input port means of the micro-computer 72 is supplied with a signal showing vehicle speed V from a vehicle speed sensor 76, a signal showing lateral acceleration Gy of the vehicle body from a lateral acceleration sensor 78 mounted substantially at a mass center of the vehicle body, a signal showing yaw rate $\gamma$ of the vehicle body from a yaw rate sensor 80, a signal showing steering angle $\theta$ from a steering angle sensor 82, a signal showing longitudinal acceleration Gx of the vehicle body from a longitudinal acceleration sensor 84 mounted substantially at the mass center of the vehicle body, signals showing wheel speed (wheel circumferential speed) Vwfl, Vwfr, Vwrl, Vwrr of front left and right wheels and rear left and right wheels not shown in the figure from wheel speed sensors 86FL–86RR, respectively, a signal showing if the brake pedal 12 is stepped on from a brake switch 88, and a signal showing the booster pressure from a booster pressure sensor 90. The lateral acceleration sensor 78, yaw rate sensor 80 and steering angle sensor 82 detect the lateral acceleration, yaw rate and steering angle, respectively, as being positive when the vehicle makes a left turn, and the longitudinal acceleration sensor 84 detects longitudinal acceleration as being positive when the vehicle is accelerated in the forward direction.

In general, in the following analyses, the parameters which are distinctive of the direction of turn of the vehicles are each assumed to be positive when the turn is counter-clockwise and negative when the turn is clockwise, as viewed from the top of the vehicle.

Figure 4:
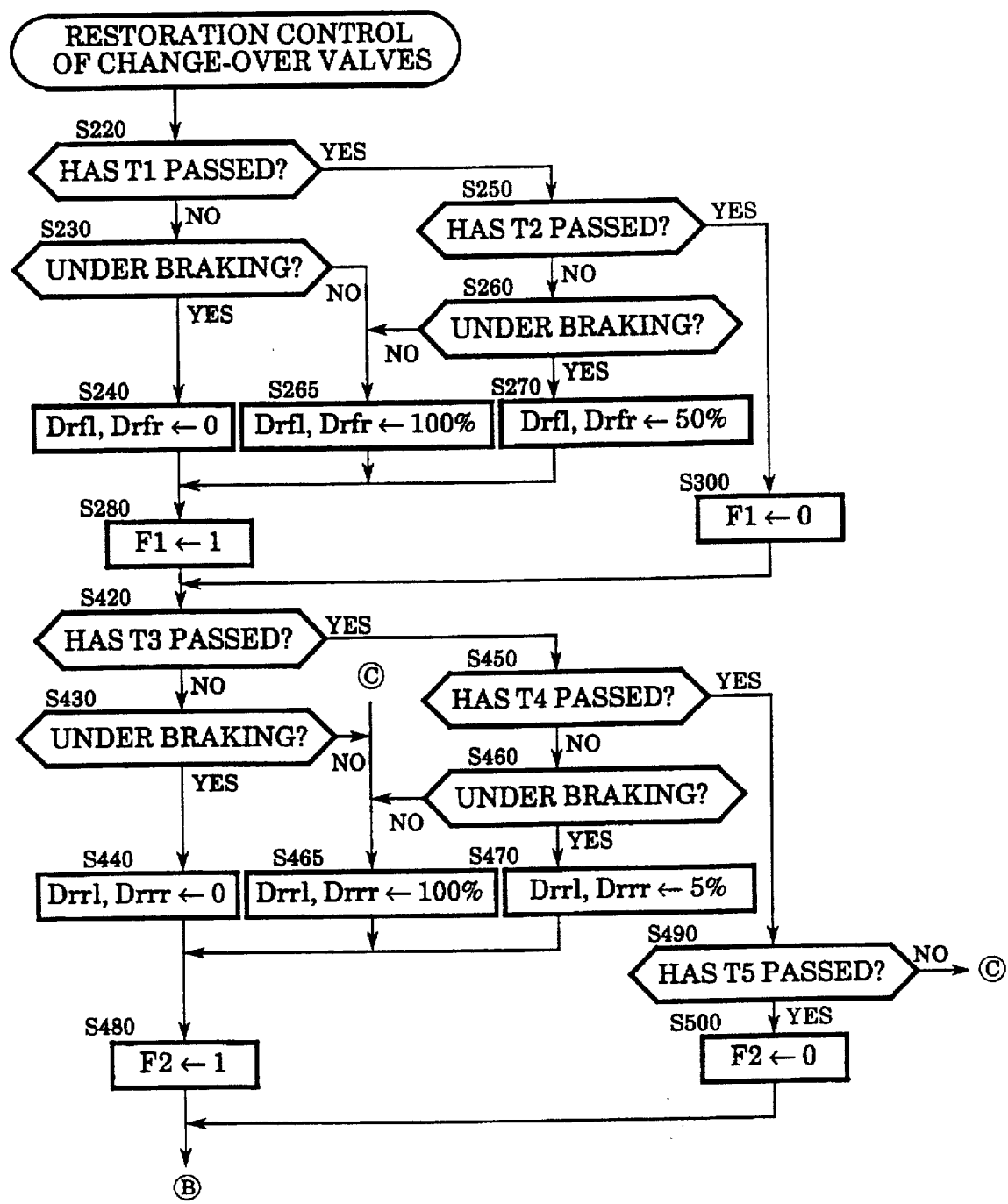
FIGS. 4 and 5 show, in combination, a flowchart of a restoration control of change-over valves 44, 50FL, 50FR and 28.
Figure 5:
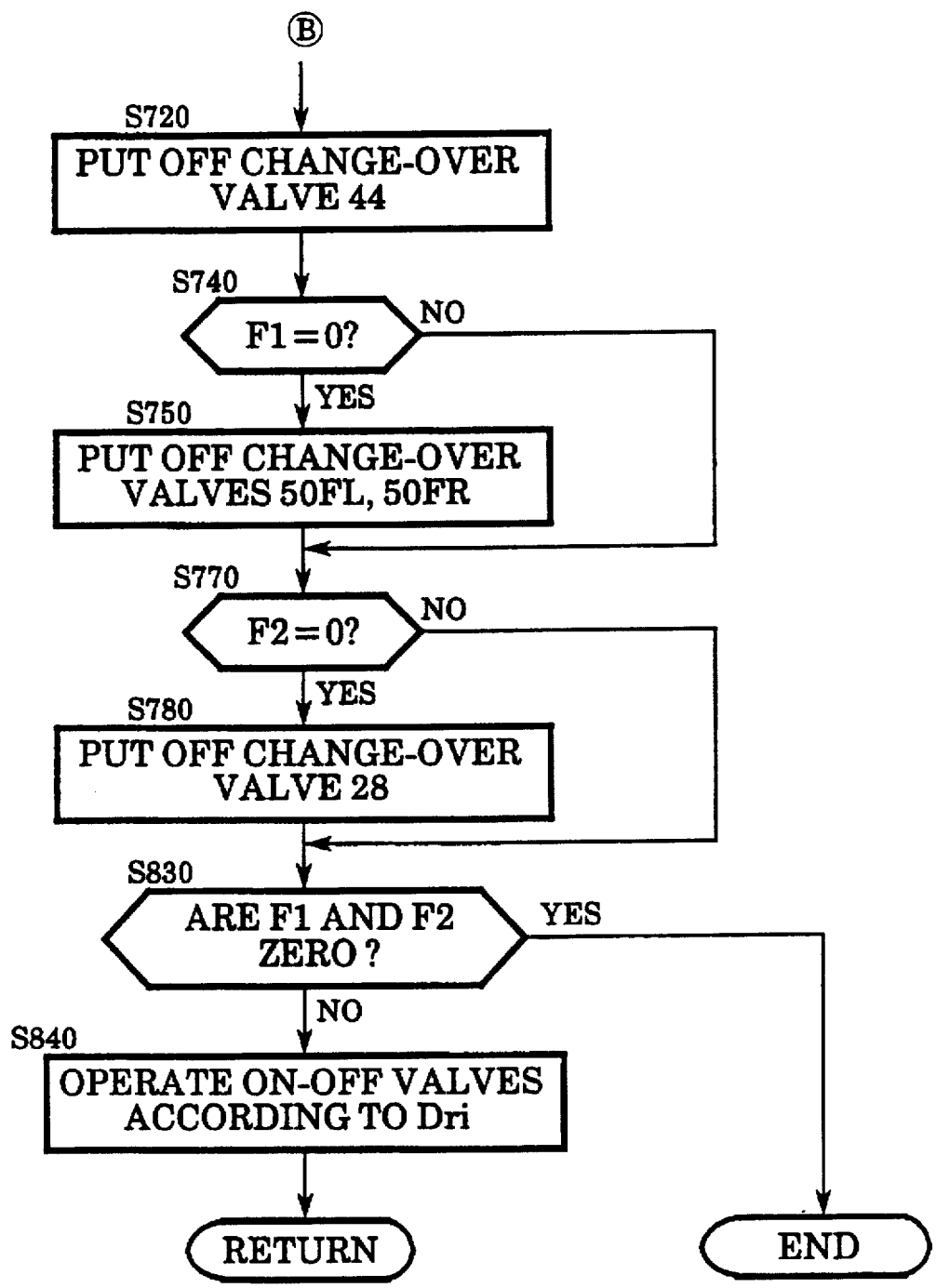
Figure 6:
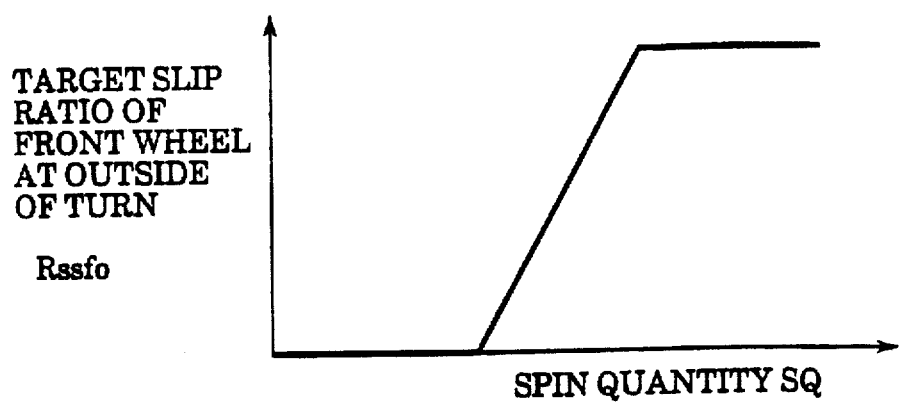
FIG. 6 is a map showing the relationship between the spin quantity SQ and the target slip ratio Rssfo of a front wheel serving at the outside of a turn to be incorporated in the routine of FIGS. 2 and 3.
Figure 7:
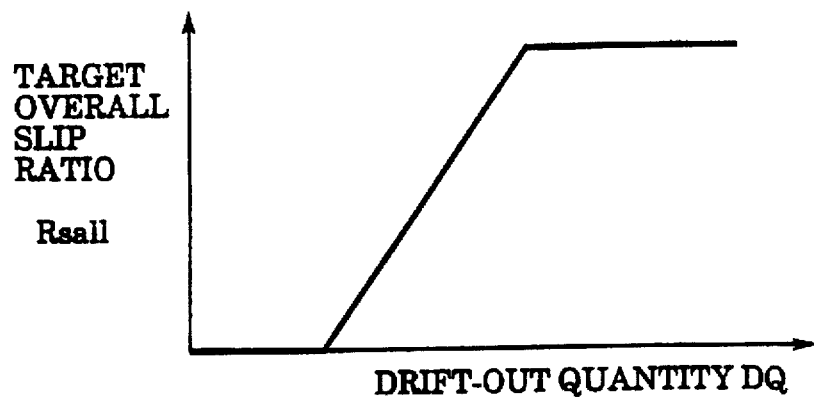
FIG. 7 is a map showing the relationship between the drift-out quantity DQ and the overall slip ratio Rsall to be incorporated in the routine of FIGS. 2 and 3.
Figure 8:
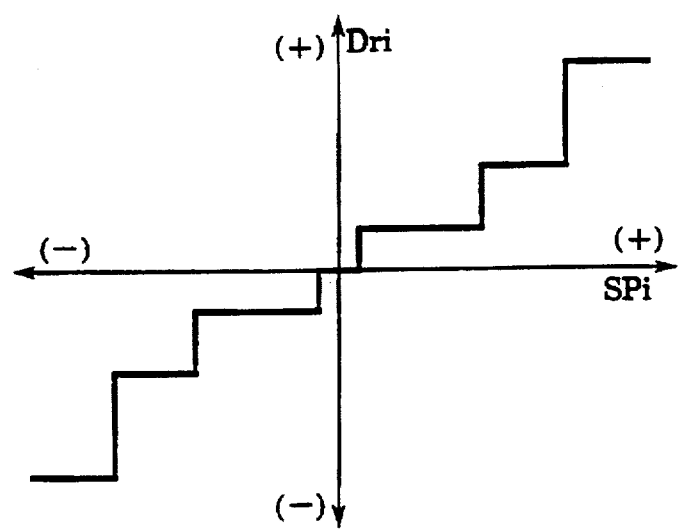
FIG. 8 is a map showing the relationship between the slip rate SPi and the duty ratio Dri to be incorporated in the routine of FIGS. 2 and 3.

The read only memory of the micro-computer 72 stores such flowcharts as shown in FIGS. 2–5, 9 and such maps as shown in FIGS. 6–8. The central processing unit conducts various calculations based upon the parameters detected by the above-mentioned sensors according to those flowcharts and maps as described hereinbelow, so as to obtain the spin quantity and the drift-out quantity for judging and estimating spin state and drift-out state of the vehicle, respectively, and controls the turn stability of the vehicle based upon the estimated quantities, particularly to suppress the vehicle against spin and drift-out, by selectively applying a variable braking force to each of the wheels.

Figure 2:
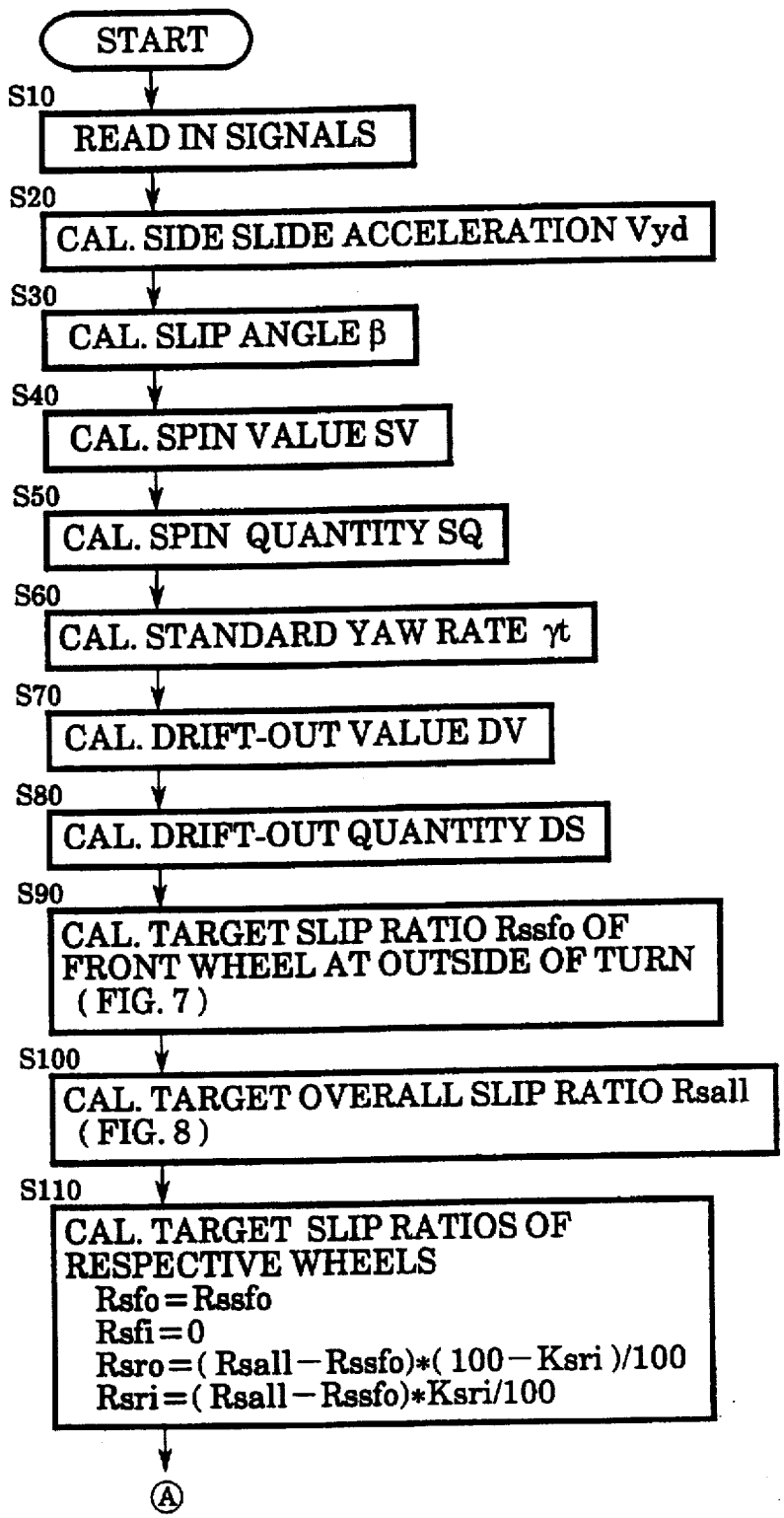
FIGS. 2 and 3 show, in combination, a flowchart of an embodiment of the stability control routine conducted by the stability control device according to the present invention.
Figure 3:
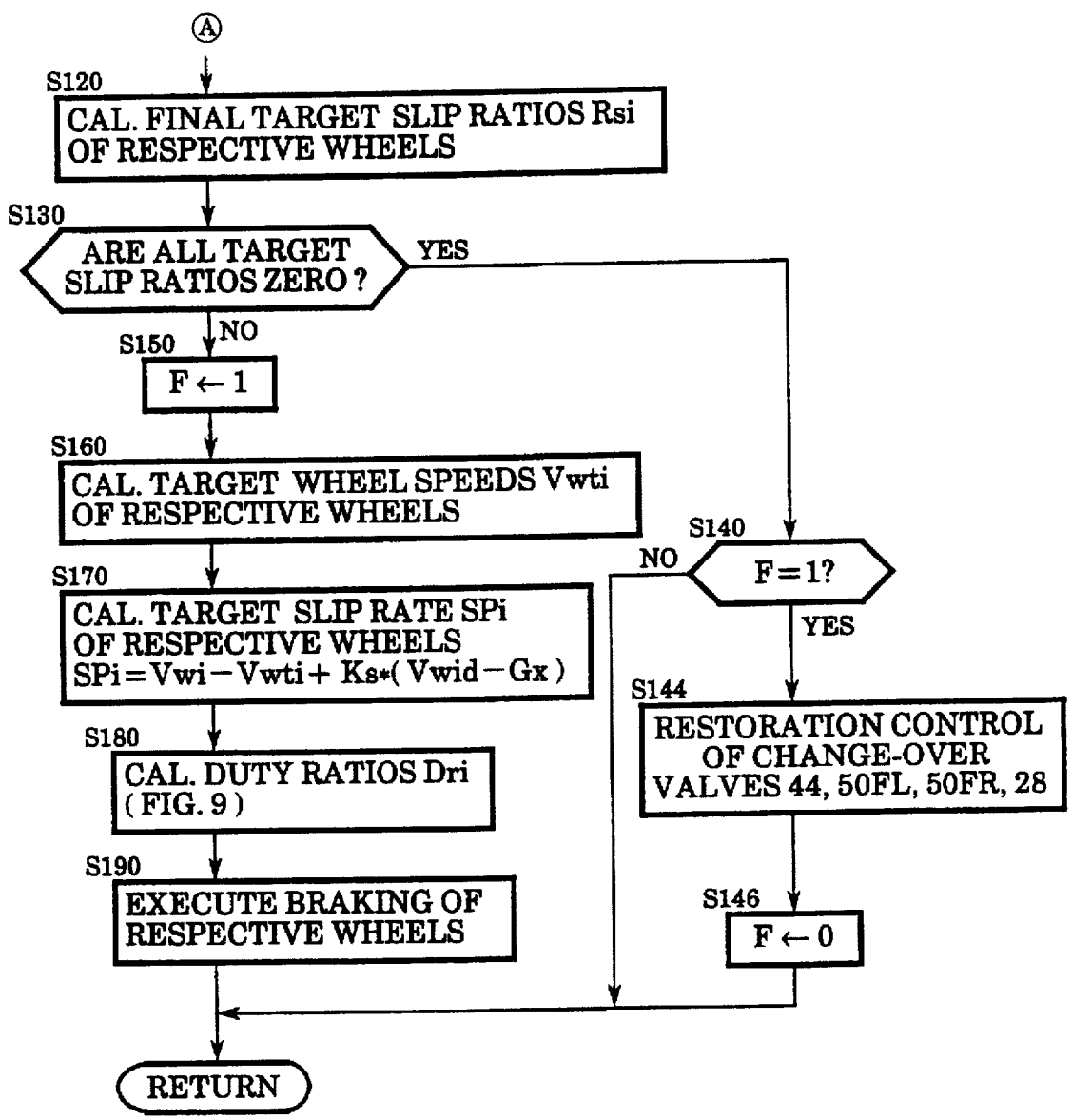

In the following, the vehicle stability control device of the present invention will be described in the form of an embodiment of its control operation with reference to FIGS. 2–9. The control according to the flowchart shown in FIGS. 2 and 3 is started by a closure of an ignition switch not shown in the figure and carried out repetitively at a predetermined time interval such as tens of micro-seconds.

In step 10, the signals including vehicle speed V from the vehicle speed sensor 76 and others are read in. In step 20, the difference between the actual lateral acceleration Gy detected by the lateral acceleration sensor 78 and a product of vehicle speed V and yaw rate γ is calculated to obtain side slide acceleration Vyd of the vehicle body as Vyd=Gy–V*γ. Then, integrating Vyd on time basis, side slide velocity Vy is obtained. In step 30, slip angle of the vehicle body β is calculated as a ratio of the side slide velocity Vy to the longitudinal velocity Vx of the vehicle body (=vehicle speed V), as β=Vy/Vx.

In step 40, taking two positive constants K1 and K2 appropriately, a value herein called spin value SV is calculated as a linear sum of the slip angle β and the side slide velocity Vyd, such as SV=K1*β+K2*Vyd. In step 50, the direction of turn of the vehicle is judged from the sign of yaw rate γ, and a parameter herein called spin quantity SQ is determined to be equal to SV when the spin value SV is positive, and to be equal to –SV when the spin value SV is negative. Or, the spin quantity may be determined to be more sensitive about the variety of turn behavior of the vehicle such that, when the spin value SV is positive in conformity with the yaw rate γ being positive, the spin quantity SQ is equal to SV but if the spin value SV is negative against the positive yaw rate γ, the spin quantity SQ is made zero, and similarly, when the spin value SV is negative in conformity with the yaw rate γ being negative, the spin quantity SQ is equal to –SV but if the spin value SV is positive against the negative yaw rate γ, the spin quantity SQ is made zero. As will be appreciated, the spin quantity SQ is a parameter which shows the liability of the vehicle body to spin.

In step 60, a target yaw rate γc is calculated according to the following formula 1, wherein H is the wheel base and Kh is an appropriate stability factor, and then a standard yaw rate γt is calculated according to following formula 2, wherein s is the Laplace operator and T is an appropriate time constant therefor.

$$\gamma c=V*\theta/(1+Kh*V^2)*H \tag{1}$$

$$\gamma t=\gamma c/(1+T*s) \tag{2}$$

The calculation of the target yaw rate γc may be modified to incorporate an influence of the lateral acceleration Gy.

In step 70, a value herein called drift-out value DV is calculated according to the following formula 3 or 4, the latter incorporating an influence of the ratio of wheel base H to vehicle speed V.

$$DV=(\gamma t-\gamma) \tag{3}$$

$$DV=H*(\gamma t-\gamma)/V \tag{4}$$

In step 80, a parameter herein called drift-out quantity DQ is determined to be equal to DV when the vehicle is making a left turn, and to be equal to –DV when the vehicle is making a right turn. When the drift-out quantity would nevertheless get negative, it is made zero. As will be appreciated, the drift-out quantity DQ is a parameter which shows the liability of the vehicle body to drift-out.

The spin quantity SQ and the drift-out quantity DQ may be understood in a common concept as a running instability quantity of the vehicle.

In step 90, referring to a map such as shown in FIG. 6, a value of target slip ratio Rssfo of a front wheel at the outside of the turn is read out against the value of the spin quantity SQ. The target slip ratio Rssfo of a front wheel at the outside of the turn is a target value for the slip ratio to be born by a front wheel serving at the outside of the turn for suppressing the vehicle against spin by an anti-spin moment applied to the vehicle body about the braked front wheel at the outside of the turn.

In step 100, referring to a map such as shown in FIG. 7, a value of target overall slip ratio Rsall is read out against the value of the drift-out quantity DQ. The target overall slip ratio Rsall is a target value for the overall slip ratio to be born by the four wheels for suppressing the vehicle against drift-out by means of decreasing vehicle speed. The braking of the rear wheels may have an additional effect of letting the rear wheels slide outside of the turn.

In step 110, by taking Ksri as a distribution factor of the target slip ratio for the rear wheels between the one serving at the inside of the turn and the other serving at the outside of the turn, target slip ratios for the front wheel at the outside of the turn, the front wheel at the inside of the turn, the rear wheel at the outside of the turn and the rear wheel at the inside of the turn, Rsfo, Rsfi, Rsro and Rsri, are calculated as follows:

Rsfo=Rssfo

Rsfi=0

Rsro=(Rsall–Rssfo)*(100–Ksri)/100

$$Rsri = (Rsall - Rssfo) * Ksri \tag{5}$$

In step 120, the target slip ratios for the front left and right wheels and rear left and right wheels are determined by either the following formula 6 or 7 according to whether the vehicle is making a left turn or a right turn:

$$Rsfl = Rsfi$$
$$Rsfr = Rsfo$$
$$Rsrl = Rsri$$
$$Rsrr = Rsro \tag{6}$$
$$Rsfl = Rsfo$$
$$Rsfr = Rsfi$$
$$Rsrl = Rsro$$
$$Rsrr = Rsri \tag{7}$$

In step 130, it is judged if the slip ratios Rsfl, Rsfr, Rsrl and Rsrr are all zero or not. When the answer is no, the control proceeds to step 150, and flag F is set to 1, whereas when the answer is yes, the control proceeds to step 140, and the restoration control of the change-over valves 44, 50FL, 50FR and 28 are executed as described hereinbelow.

In step 160, taking Vb as a reference vehicle speed (for example, the wheel speed of the front wheel at the inside of the turn), target wheel speeds Vwti (i=fl, fr, rl, rr) of the respective wheels are calculated follows:

$$Vwti = Vb*(100 - Rsi)/100 \tag{8}$$

In step 170, by taking Vwid as accelerations of the respective wheels (differential of Vwi) and Ks as an appropriate positive constant, target slip rates SPi of the respective wheels are calculated as follows:

$$SPi = Vwi - Vwti + Ks*(Vwid - Gx) \tag{9}$$

In step 180, referring to a map such as shown in FIG. 8, duty ratios Dri (i=f, fr, rl, rr) for the respective wheels are obtained to correspond to the values of SPi, to determine the on-off durations of the on-off valves 54FL or 56FL, 54FR or 56FR, 60RL or 62RL and 60RR or 62RR. A positive value of Dri is a ratio of on time duration to off time duration applied to valve 54FL, 54FR, 60RL or 60RR, while a negative value of Dri is a ratio of on time duration to off time duration to off time duration applied to valve 56FL, 56FR, 62FL or 62RR.

In step 190, change-over valves 50FL, 50FR, 44 and 28 are put on, i.e. changed over to the respective second positions opposite to the first positions shown in FIG. 1, and on-off valves 54FL or 56FL, 54FR or 56FR, 60RL or 62RL and 60RR or 62RR are operated according to the duty ratios Dri, so that a selected one or ones of the front left and right wheels and the rear left and right wheels are applied with a controlled braking force as calculated hereinabove.

In step 140, it is judged if flag F is 1. When the answer is no, the control returns to step 10, as no stability control has ever been carried out and there is yet no need for a stability control. However, when the answer of step 140 is yes, the control proceeds to step 144, and a restoration control of the change-over valves 44, 50FL, 50FR and 28 is executed with reference to FIGS. 4 and 5.

Referring to FIGS. 4 and 5, in step 220 it is judged if a predetermined time T1 such as e.g. 50 ms passed since the control has reached step 144. When the answer is no, the control proceeds to step 230, and it is judged if the vehicle is under braking by the driver, i.e. the brake pedal 12 is stepped on such as to be detected by the brake switch 88. When the answer is yes, the control proceeds to step 240, and the duty ratios Drfl and Drfr of the two front wheels are made zero. By this control, the on-off valves 54FL, 56FL, 54FR, 56FR are all temporarily withheld in the closed condition. Then the control proceeds to step 280, and flag F1 is set to 1, and then the control proceeds to step 420. When the answer of step 230 is no, the control proceeds to step 265, and Drfl and Drfr are both made 100%, i.e. the normally open type on-off valves 54FL and 54FR are immediately put off so that these valves are restored to the first position shown in FIG. 1. However, the control still proceeds to step 280, so as to set flag F1 to 1 for the time being.

When the answer of step 220 is yes, the control proceeds to step 250, and it is judged if a predetermined time T2 longer than T1 such as e.g. 400 ms passed since the control has reached step 144. When the answer is no, the control proceeds to step 260, and it is judged if the vehicle is under braking by the driver, as in step 230. When the answer is no, the control proceeds to step 265 so that Drfl and Drfr are both made 100%. However, when the answer is yes, the control proceeds to step 270, and Drfl and Drfr are set to 50% (only as an embodiment), i.e. the normally open type on-off valves 54FL and 54FR are half restored toward the first position shown in FIG. 1 (in fact, such that the total open time duration is equal to the total closed time duration in the cyclic on-off operation thereof). When the answer of step 250 is yes, i.e. the time T2 passed since the control has reached step 144, the control proceeds to step 300, and flag F1 is reset to 0, and then the control proceeds to step 420.

In step 420, it is judged if a predetermined time T3 such as e.g. 50 ms (but may be different from the same value for the front wheels) passed since the control has reached to step 144. When the answer is no, the control proceeds to step 430, and it is judged if the vehicle is under braking, as made in step 230 or 260. When the answer is yes, the control proceeds to step 440, and the duty ratios Drrl and Drrr of the two rear wheels are made zero, so that the on-off valves 60RL, 62RL, 60RR, 62RR are all temporarily withheld in the closed condition. Then the control proceeds to step 480, and flag F2 is set to 1, and the control proceeds to step 720. When the answer of step 430 is no, the control proceeds to step 465, and Drrl and Drrr are set to 100%, i.e. the normally open type on-off valves 60RL and 60RR are immediately put off so that these valves are restored to the first position shown in FIG. 1. However, the control still proceeds to step 480, so as to set flag F2 to 1 for the time being.

When the answer of step 420 is yes, the control proceeds to step 450, and it is judged if a predetermined time T4 longer than the time T3 such as 400 ms (but also may be different from the same value for the front wheels) passed since the control has reached to step 144. When the answer is no, the control proceeds to step 460, and it is judged if the vehicle is under braking. When the answer is no, the control proceeds to step 465 so that Drrl and Drrr are immediately made 100%, while when the answer of step 460 is yes, the control proceeds to step 470, and Drrl and Drrr are made 5% (only as an embodiment). Then the control proceeds to step 480.

When the answer of step 450 is yes, the control proceeds to step 490, and it is judged if a predetermined time T5 longer than the time T4 such as e.g. 1500 ms passed since the control has reached step 144. When the answer is no, the control proceeds to step 465, to completely open the normally open type change-over valves 60RL and 60RR, but flag F2 is still kept at 1. When the answer of step 490 turns to yes, the control proceeds to step 500, regardless whether the brake pedal is being stepped on or not, and flag F2 is reset to 0, and then the control proceeds to step 720.

In step 720, the change-over valve 44 is put off so that it is restored to its first position shown in FIG. 1, whereby the lines 53 and 68 are now supplied with the booster pressure from the booster 16 corresponding to the stepping-on amount of the brake pedal 12 by the driver. Then in step 740, it is judged if flag F1 is zero or not. When the answer is no, the control bypasses step 750 so that the change-over valves 50FL and 50FR are kept on in the respective put on or second condition shifted rightward from the put off or first condition shown in FIG. 1, whereas when the answer of step 740 is yes, the control proceeds to step 750, and the change-over valves 50FL and 50FR are put off to be restored to the respective first positions shown in FIG. 1, so that the front wheel cylinders 48FL and 48FR are placed under the direct control of the master cylinder 14.

In step 770, it is judged if flag F2 is zero. When the answer is no, the control bypasses step 780 so that the change-over valve 28 is kept on in its put on or second condition shifted rightward from the put off or first condition shown in FIG. 1, whereas when the answer of step 770 is yes, the control proceeds to step 780, and the change-over valve 28 is restored to its first position shown in FIG. 1, so that the rear wheel cylinders 64RL and 64RR are placed under the direct control of the master cylinder 14.

In step 830, it is judged if flags F1 and F2 are both zero. When the answer is no, the control proceeds to step 840, and the on-off valves 54FL, 54FR, 60RL and 60RR (but only those of which Dri is not yet 100%) are controlled according to the duty ratios Dri (i=fl, fr, rl, rr) determined in the preceding steps of the restoration control. When the answer of step 830 turns to yes, the change-over restoration control by step 144 is finished, and therefore the control proceeds to step 146 in FIG. 3, so that flag F is reset to 0. Then the control returns to step 10.

Figure 9:
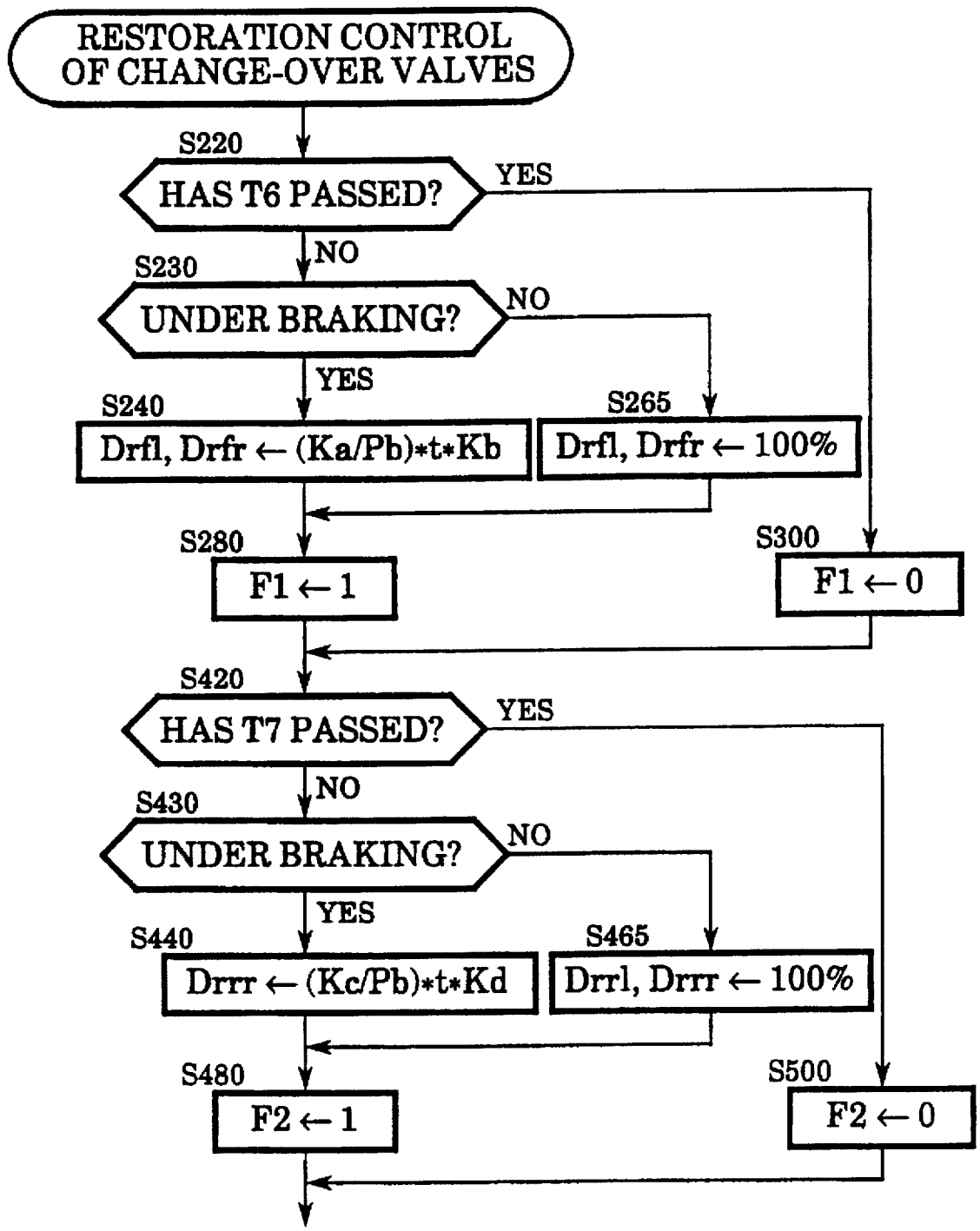
FIG. 9 is a flowchart showing another embodiment of a part of the restoration control of the change-over valves.

The controls shown by steps 220 to 480 may be replaced by such a control as shown in FIG. 9. In this modification, when it is detected in step 230 that the vehicle is under braking, then in step 240 Drfl and Drfr are calculated according to lapse of time t since the control has reached step 144, by taking Pb as the booster pressure detected by the booster pressure sensor 90 and Ka and Kb as appropriate positive constants, as follows:

$$Drfl=Drfr=(Ka/Pb)*t*Kb \quad (10)$$

Then, when a predetermined time T6 passed since the control has reached step 144, the control proceeds immediately to step 300 so that flag F1 is reset to 0.

Similarly, in this modification, when it is detected in step 430 that the vehicle is under braking, then in step 440 Drrl and Drrr are calculated according to lapse of time t since the control has reached step 144, by taking Kc and Kd as appropriate positive constants, as follows:

$$Drrl=Drrr=(Kc/Pb)*t*Kd \quad (11)$$

Similarly, when a predetermined time T7 passed since the control has reached step 144, the control proceeds immediately to step 500 so that flag F2 is reset to 0.

Thus, as will be appreciated, according to these change-over valve restoration controls, if the braking pedal is being substantially stepped on when the stability control ended, the change-over valves 50FL, 50FR and 28 are not immediately changed over to the respective first positions shown in FIG. 1 but are kept in the respective second positions, with the on-off valves 54FL, 54FR, 60RL, 60RR being controlled with certain duty ratios as exemplary shown in the above, so that the fluid pressures of the wheel cylinders 48FL, 48FR, 64RL, 64RR are gradually raised at certain controlled uprise rates up to the booster pressure having substantial pressure value due to the substantial stepping on of the brake pedal by the driver, thereby causing no abrupt braking being applied to the wheels.

Although the invention has been described in detail with respect to some preferred embodiments thereof, it will be apparent for those skilled in the art that various modifications are possible with respect to the shown embodiment without departing from the spirit of the present invention.

I claim:

1. A stability control device of a vehicle having a vehicle body, and front left, front right, rear left and rear right wheels, comprising:

a means for estimating a liability of the vehicle body to a running instability for producing an instability quantity which generally increases along with increase of the liability;

a brake means for selectively applying a variable braking force to each of said wheels, said brake means including a manually controlled pressure source means incorporating a brake pedal and an accumulator pressure source means;

a manual brake sensing means for detecting a substantial stepping on of said brake pedal by a driver; and a control means for controlling said brake means so as variably to apply a braking force to a selected one or ones of said wheels for a stability control of suppressing the vehicle body against the running instability based upon accumulator pressure from said accumulator pressure source means, said control means controlling said brake means so that a braking force is applied to the wheels based upon said manually controlled pressure source means when said stability control is not carried out, wherein, when the substantial stepping on of said brake pedal is detected by said manual brake sensing means when said control means ends said stability control, said control means controls said brake means so that the braking force based upon said manually controlled pressure source means is applied to the wheels under a controlled uprise rate.

2. A stability control device according to claim 1, wherein said control means controls said uprise rate separately for the front wheels and the rear wheels.

3. A stability control device according to claim 1, wherein said control means controls said uprise rate to be increased in steps as time progresses.

4. A stability control device according to claim 1, wherein said control means controls said uprise rate to decrease as the fluid pressure of the manually controlled pressure source means is increased.

* * * * *